3,150,191
PHENOL COLOR REDUCTION
Charles Clifford Oldenburg, San Rafael, Calif., assignor to California Research Corporation, San Francisco, Calif., a corporation of Delaware
No Drawing. Filed Feb. 29, 1960, Ser. No. 11,475
7 Claims. (Cl. 260—621)

This invention relates to a purification treatment of phenol containing color precursors which produce undesirable color bodies upon chlorination of the phenol. More particularly, the invention has to do with a process for the inactivation of color precursors in phenol involving contacting the impure phenol with borohydride ion. The invention is especially applicable to the treatment of phenol produced by the cumene process to render innocuous connate material which produces undesirable color bodies when the phenol is subsequently chlorinated.

As is known, large quantities of phenol are produced by the so-called cumene process involving the cleavage of cumene hydroperoxide into phenol and acetone. While phenol produced in accordance with this process and isolated and purified in the normal manner is of apparent clear color, upon subsequent reaction it has been observed that undesirable color formation occurs. A conspicuous example of undesirable color formation upon subsequent reaction is the preparation of the chlorophenols, such as pentachlorophenol, extensively used in the preservation of wood, or tetrachlorophenol, a general disinfectant and fungicide useful in the preservation of cellulosic products, including paper, insulation board and wood. Thus it has been observed that when phenol manufactured by the cumene process is chlorinated in the presence of chlorine carriers to produce, for example, pentachlorophenol, the resulting product has an undesirable red color. The colored chlorophenol compound cannot, therefore, be used satisfactorily in the preservation of those wood products the natural color of which it is desired to retain. Similarly, where it is desired to prepare a clear resin product, e.g., by the interaction of phenol and formaldehyde, undesirable color formation occurs with untreated phenol, and this in spite of the fact that the phenol appears to be clear and free of any undesirable color precursors formed in the phenol manufacturing process along with the phenol.

It has now been found that these connate impurities which develop undesirable color upon subsequent reaction of cumene-produced phenol can be inactivated or rendered innocuous by a simple contacting process in which the phenol is contacted, preferably in the presence of water, with borohydride ion which may be derived from a soluble borohydride salt, such as the alkali metal borohydrides of lithium, sodium and potassium; or the alkaline earth metal borohydrides, such as the borohydrides of calcium, magnesium, and barium. The preferred materials are the alkali metal lithium, sodium, and potassium borohydrides. Since the ammonium radical is quite similar in chemical behavior to the sodium and potassium ions, ammonium borohydride is regarded as the equivalent of the alkali metal borohydrides and is included in this group. Following reaction, the treated phenol can be recovered, and this may be accomplished by a simple distillation step.

The amount of borohydride employed, of course, will vary with amount of impurity present in the phenol and temperatures of contact. In general, the proportion of treating agent can conveniently be expressed in terms of borohydride ion ($BH_4^-$), inasmuch as this is believed to be the portion of the molecule effective in the production of the desired results. Accordingly, effective amounts of treating agent, expressed as borohydride ion, range by weight from about 0.003 up to 0.3 per 100 parts of phenol to be treated. At these concentrations of 0.003 to 0.3 percent by weight of borohydride ion, based on phenol, the borohydride salt is soluble in the crude phenol, as a result of which ionization occurs to yield the borohydride ion. While greater proportions of treating agent can exceed the specified upper limit without any adverse effects, it has been noted, on the other hand, that greater amounts do not result in substantial further reduction of color. Accordingly, for most purposes, a top upper limit of borohydride salt not exceeding about 0.15 percent, expressed as borohydride ion, will be found satisfactory.

As indicated above, for best results the treating process is conducted in the presence of water, and an amount of water of about 1 to 25 percent by weight based on the phenol-water mixture can be cited as a broad range, amounts of 5 to 20 percent representing a satisfactory narrower range. Accordingly, in the preferred embodiment of the invention, the borohydride salt can be added in the form of an aqueous solution containing an amount of water calculated to give a water content in the treating step within the specified range. Or, if desired, solid dry borohydride salt can be added to substantially water-free phenol or to phenol containing the desired water content.

In carrying out the process of the invention, it is advantageous to effect the treatment of the phenol in a homogenous liquid phase. Accordingly, the treating temperatures can vary over a fairly wide range. The lower limit of the range is controlled by the melting or solidification point of the phenol-water mixture, while the upper range is controlled by that temperature at which hydrolysis of the borohydride ion interferes with the inactivation of the color formers. Thus, temperatures above about 25° C. but below 100° C., preferably not higher than 95° C., will be found satisfactory. In general, temperatures nearer the upper limit will give rise to a shorter reaction time.

The time of reaction required to produce a phenol yielding a satisfactory product on chlorination will, of course, vary with the amount of impurity in the phenol, the concentration of treating agent, and treating temperatures employed. In general, the reaction can be a short one, i.e., of the order of minutes or the time required just necessary for thorough mixing. Longer periods of time of 1 to 2 hours can also be used. At any rate, the time is not critical, and contact can be maintained for as long as desired, provided that intimate contact has once been effected.

As is known, borohydride salts are sensitive to hydrolysis as the pH of the medium is lowered, in accordance with the equation:

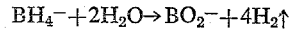

$$BH_4^- + 2H_2O \rightarrow BO_2^- + 4H_2\uparrow$$

Indeed, it is stated that the borohydride ion is stable above pH 9. The surprising feature of the present invention is that, although the phenol-water system has a pH much less than 9, i.e., about 4.1, it is possible to accomplish a conversion of the color precursor or precursors in the phenol to some unobjectionable form, the sensitivity of the borohydride anion to low pH notwithstanding, and with but a small amount of reagent.

In obtaining the comparative color data hereinbelow appearing, the optical densities of the phenol colored upon chlorination are obtained by the use of a spectrophotometer covering a wave length range from 390 millimicrons through 540 millimicrons and an optical density range from about 0 to 2, accurate to 1 percent of reading, employing a pair of matched Corex cells having a light path of 10 mm. In conducting the chlorination color test, 5 milliliters of phenol sample are placed into a 4-inch soft glass test tube using a prewarmed pipette. The test tube is placed in a water bath at 60° C.±1° C. Chlorine is caused to flow through a bubbler tube, immersed in the test tube within one-fourth inch from bottom, for exactly three minutes, the flow of chlorine being such that an increase in weight of about 15 percent (0.77 g. to 0.79 g.) occurs. Within thirty minutes after chlorination, the chlorinated phenol is transferred from the test tube to a 10 mm. Corex cell, and the matched reference cell is filled with distilled water. The cells are then placed in the spectrophotometer, and the optical density is measured. Untreated phenol herein contemplated can have an optical density reading hereinafter referred to as chlorination color, varying from 0.6 to 1.5 at a wave length range of 500 to 520 millimicrons.

Example 1

Phenol produced by the cumene process and of apparent clear color and having a chlorination color (optical density) of 0.7 to 1.0 at a wave length of 500–520 millimicrons is mixed at room temperature with water to give a 90 percent, by weight, phenol solution. An aqueous solution containing the tabulated amounts, in percent by weight based on phenol, of potassium borohydride was mixed with the phenol solution to give a final solution of about 80 percent phenol. Immediately after mixing to form a homogeneous solution, the solution is distilled at 150 mm. Hg. Chlorination colors of the various runs are tabulated below.

| Weight percent, $KBH_4$ added: | Chlorination color (optical density) |
|---|---|
| 0.04 ($BH_4^-$ equivalent=0.011) | 0.26 |
| 0.10 ($BH_4^-$ equivalent=0.029) | 0.10 |
| 0.47 ($BH_4^-$ equivalent=0.129) | 0.07 |
| 1.05 ($BH_4^-$ equivalent=0.288) | 0.07 |
| 1.57 ($BH_4^-$ equivalent=0.429) | 0.07 |

It is noted that increasing borohydride ion content above 0.129 wt. percent did not produce incremental improvement in results.

Example 2

Phenol like that of Example 1, heated to the indicated temperatures, is treated with 0.45 percent, based on phenol, of potassium borohydride ($BH_4^-$ equivalent=0.13 percent) in the presence of water in the indicated percentages by weight based on phenol and water. The water is added mixed with the treating agent. Treating time at the indicated temperature is for 1 hour. After treatment, the phenol is distilled and its chlorination color is determined.

| Added Water, Wt. Percent | Temperature °C. | Chlorination Color (Optical Density) |
|---|---|---|
| 0 | 50 | 0.22 |
| 5 | 50 | 0.08 |
| 20 | 50 | 0.05 |
| 20 | 25 | 0.07 |

Example 3

Phenol like that of Example 1 is heated to 50° C. A solution of sodium borohydride and water is added to give 0.3 percent, by weight, based on phenol ($BH_4^-$ equivalent=0.093%), of $NaBH_4^-$, and 5 percent water based on the water-phenol mixture. Heating at 50° C. was continued for 2 hours. Distillation of phenol after treatment is effected. Treated phenol has a chlorination color (optical density) of 0.07.

Example 4

Example 3 is repeated except that the treating temperature is 90° C. Following treatment the phenol is distilled. It has a chlorination color of 0.07.

Example 5

Example 3 is repeated except that the amount of sodium borohydride used is 0.05 percent ($BH_4^-$ equivalent=0.015%). The distilled phenol has a chlorination color of 0.3.

Example 6

Phenol like that of Example 1 is treated with 0.147 percent lithium borohydride ($BH_4^-$ equivalent=0.1%) in the presence of 5 percent, by weight, of water, based on phenol and water. Treatment at 30° C. is carried out for ½ hour. After treatment, the phenol is distilled. Chlorination color of the phenol is 0.05.

I claim:

1. Process for the treatment of phenol prepared by the cumene process having associated therewith connate impurities which produce undesirable color bodies upon chlorination of the phenol, which comprises contacting the phenol with a soluble borohydride salt selected from the class consisting of borohydrides of alkali metals, ammonium and alkaline earth metals in an effective amount, calculated as borohydride ion, of at least 0.003 percent, by weight, based on the phenol, in the presence of 1 to 25 percent, by weight, of water, based on phenol and water, at a temperature above the solidification point of the phenol, but below 100° C., for a period of time sufficient to render color-producing impurities innocuous upon subsequent chlorination of the phenol and then distilling the phenol to separate purified phenol from impurities.

2. Process according to claim 1 wherein the borohydride ion is derived from an alkali metal borohydride.

3. Process for the treatment of phenol prepared by the cumene process having associated therewith connate impurities which produce undesirable color upon chlorination of the phenol, which comprises intimately contacting the phenol with a member of the class consisting of borohydrides of alkali metals, ammonium and alkaline earth metals in an effective amount of at least 0.003 percent, by weight, based on the phenol, of borohydride ion in the presence of water in proportions of 5 to 20 percent, by weight, based on phenol and water, and effecting said contacting at a temperature in the range of 25° C. to 95° C., and for a short period of time sufficient to render the color producing impurities innocuous upon subsequent chlorination of the phenol, and then distilling the phenol to separate the purified phenol from impurities.

4. Process according to claim 3 wherein the phenol to be treated has an optical density in the range 0.6 to 1.5 at a wave length of 500–520 millimicrons.

5. Process according to claim 4 wherein the borohydride ion is derived from sodium borohydride.

6. Process according to claim 4 wherein the borohydride ion is derived from potassium borohydride.

7. Process according to claim 4 wherein the borohydride is lithium borohydride.

References Cited in the file of this patent

UNITED STATES PATENTS

| 2,683,721 | Schlesinger | July 13, 1954 |
| 2,715,145 | Bewley et al. | Aug. 9, 1955 |
| 2,971,893 | Hood | Feb. 14, 1961 |

FOREIGN PATENTS

| 802,054 | Great Britain | Sept. 24, 1958 |